(12) United States Patent
Pikovsky et al.

(10) Patent No.: US 9,363,143 B2
(45) Date of Patent: *Jun. 7, 2016

(54) SELECTIVE COMPUTATION USING ANALYTIC FUNCTIONS

(75) Inventors: Alexander Pikovsky, Lexington, MA (US); David Joel Pennell, Sr., Dripping Springs, TX (US); Jon Hylands, Scotland (CA); Stephen Pair, Roswell, GA (US); Monty Kamath, Hudson, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2463 days.

This patent is subject to a terminal disclaimer.

(21) Appl. No.: 12/056,853

(22) Filed: Mar. 27, 2008

(65) Prior Publication Data

US 2009/0244067 A1    Oct. 1, 2009

(51) Int. Cl.
*G06F 15/16* (2006.01)
*H04L 12/24* (2006.01)

(52) U.S. Cl.
CPC .............. *H04L 41/12* (2013.01); *H04L 41/142* (2013.01)

(58) Field of Classification Search
CPC .............................. H04L 41/12; H04L 41/142
USPC ......................................................... 709/201
See application file for complete search history.

(56) References Cited

U.S. PATENT DOCUMENTS

| | | | |
|---|---|---|---|
| 5,884,037 A | 3/1999 | Aras et al. | |
| 6,125,105 A | 9/2000 | Edwards et al. | |
| 6,496,831 B1 | 12/2002 | Baulier et al. | |
| 6,502,133 B1 | 12/2002 | Baulier et al. | |
| 6,604,114 B1 | 8/2003 | Toong et al. | |
| 6,839,754 B2 * | 1/2005 | Nowak et al. | 709/224 |
| 6,895,397 B2 * | 5/2005 | Nagamura et al. | 706/46 |
| 6,925,492 B2 | 8/2005 | Shirriff | |
| 7,069,514 B2 | 6/2006 | DeMesa et al. | |
| 7,124,055 B2 | 10/2006 | Breiman | |
| 7,200,530 B2 * | 4/2007 | Brown et al. | 703/1 |
| 7,280,988 B2 | 10/2007 | Helsper et al. | |

(Continued)

OTHER PUBLICATIONS

Hovey et al; "Evolution of Optimal Compute Server Clusters for Dynamic Load-balancing Systems", The 2003 Congress on Evolutionary Computation, 2003. CEC '03., vol. 1, pp. 528-535 vol. 1.

*Primary Examiner* — Douglas Blair
(74) *Attorney, Agent, or Firm* — Garg Law Firm, PLLC; Rakesh Garg; Joseph Petrokaitis

(57) ABSTRACT

A system, and computer usable program product for selective computation using analytic functions are provided in the illustrative embodiments. An object graph and information about a change therein is received. The object graph includes several objects representing several resources in an environment as well as a set of analytic function instances in relation to the objects. A set of analytic function dependencies is determined. A first analytic function instance in the set of analytic function instances that has to be re-executed based on the change is identified. A re-computation graph is computed using the analytic function instance and presented. The change may be an addition, a deletion, a modification, or a combination thereof. The change may be a change in an object, in a relationship between two objects, in a relationship between an object in and an analytic function instance in the set of analytic function instances, or in an analytic function instance.

16 Claims, 6 Drawing Sheets

(56) References Cited

U.S. PATENT DOCUMENTS

| | | | |
|---|---|---|---|
| 7,406,200 B1 | 7/2008 | Syeda-Mahmood et al. | |
| 7,415,453 B2 | 8/2008 | Suzuki et al. | |
| 7,509,234 B2 | 3/2009 | Unnikrishnan et al. | |
| 7,526,461 B2 | 4/2009 | Srinivasa et al. | |
| 7,617,303 B2 * | 11/2009 | Duggirala | 709/223 |
| 7,742,959 B2 | 6/2010 | Müller | |
| 7,747,641 B2 | 6/2010 | Kim et al. | |
| 2001/0013008 A1 | 8/2001 | Waclawski | |
| 2002/0049838 A1 | 4/2002 | Sylor et al. | |
| 2002/0062368 A1 | 5/2002 | Holtzman et al. | |
| 2002/0069281 A1 | 6/2002 | Dillenberger et al. | |
| 2002/0143935 A1 * | 10/2002 | Schenkel et al. | 709/224 |
| 2002/0152305 A1 | 10/2002 | Jackson et al. | |
| 2003/0023719 A1 | 1/2003 | Castelli et al. | |
| 2004/0024773 A1 | 2/2004 | Stoffel et al. | |
| 2004/0083389 A1 | 4/2004 | Yoshida | |
| 2004/0155899 A1 * | 8/2004 | Conrad | 345/736 |
| 2005/0091361 A1 * | 4/2005 | Bernstein et al. | 709/223 |
| 2005/0102193 A1 | 5/2005 | Day et al. | |
| 2005/0138164 A1 | 6/2005 | Burton et al. | |
| 2006/0025985 A1 * | 2/2006 | Vinberg et al. | 703/22 |
| 2006/0056436 A1 | 3/2006 | Horikawa | |
| 2006/0277283 A1 | 12/2006 | Bower et al. | |
| 2006/0294238 A1 | 12/2006 | Naik et al. | |
| 2007/0130208 A1 | 6/2007 | Bornhoevd et al. | |
| 2007/0150599 A1 | 6/2007 | Neogi et al. | |
| 2007/0214262 A1 * | 9/2007 | Buchbinder et al. | 709/224 |
| 2007/0271560 A1 | 11/2007 | Wahlert et al. | |
| 2008/0209434 A1 | 8/2008 | Queck et al. | |
| 2008/0222287 A1 * | 9/2008 | Bahl et al. | 709/224 |
| 2009/0248722 A1 | 10/2009 | Pikovsky et al. | |
| 2010/0262467 A1 * | 10/2010 | Barnhill et al. | 705/10 |

* cited by examiner

SELECTIVE COMPUTATION USING ANALYTIC FUNCTIONS

RELATED APPLICATION

The present invention is related to similar subject matter of and commonly assigned U.S. Patent Application Serial No. 12/056,877 entitled "DEPLOYING ANALYTIC FUNCTIONS," filed on Mar. 27, 2008, and U.S. Patent Application Serial No. 12/056,890 entitled "CLUSTERING ANALYTIC FUNCTIONS," filed on Mar. 27, 2008, which are hereby incorporated by reference.

BACKGROUND OF THE INVENTION

Field of Invention

The present invention relates generally to an improved data processing system, and in particular, to performing data analysis. Still more particularly, the present invention relates to a, system, and computer usable program code for selective computation using analytic functions.

Description of the Related Art

Present data processing environments include a collection of hardware, software, firmware, and communication pathways. The hardware elements can be of a vast variety, such as computers, other data processing systems, data storage devices, routers, switches, and other networking devices, to give some examples. Software elements may be software applications, components of those applications, copies, or instances of those applications or components.

Firmware elements may include a combination of hardware elements and software elements, such as a networking device with embedded software, a circuit with software code stored within the circuit. Communication pathways may include a variety of interconnections to facilitate communication among the hardware, software, or firmware elements. For example, a data processing environment may include a combination of optical fiber, wired or wireless communication links to facilitate data communication within and outside the data processing environment.

Management, administration, operation, repair, expansion, or replacement of elements in a data processing environment relies on data collected at various points in the data processing environment. For example, a management system may be a part of a data processing environment and may collect performance information about various elements of the data processing environment over a period. As another example, a management system may collect information in order to troubleshoot a problem with an element of the data processing environment. As another example, a management system may collect information to analyze whether an element of the data processing environment is operating according to an agreement, such as a service level agreement.

Furthermore, the various elements of a data processing environment often have components of their own. For example, a router in a network may have many interfaces to which many data processing systems may be connected. A software application may have many components, such as web services and instances thereof, that may be distributed across a network. A communication pathway between two data processing systems may have many links passing through many routers and switches.

Management systems may collect data at or about the various components as well in order to gain insight into the operation, control, performance, troubles, and many other aspects of the data processing environment. Each element or component can be a source of data that is usable in this manner. The number of data sources in some data processing environments can be in the thousands or millions, to give a sense of scale.

Furthermore, not only is the data collected from a vast number of data sources, a variety of data analyses has to be performed on a combination of such data. A software component, a data processing system, or another element of the data processing environment may perform a particular analysis. In some data processing environments, such as the examples provided above for scale, the number of analyses can range in the millions.

Additionally, a particular analysis may be relevant to a particular part of the data processing environment, or use data sources situated in a particular set of data processing environment elements. Consequently, the various elements and components in the data processing environment performing the millions of analyses may be scattered across the data processing environment, communicating and interacting with each other to provide the management insight.

SUMMARY OF THE INVENTION

The illustrative embodiments provide a system, and computer usable program product for selective computation using analytics functions. An object graph is received. The object graph includes several objects representing several resources in an environment. A resource may include a physical component of the environment. An object may include a logical construct corresponding to the physical component. The object graph further includes a set of analytic function instances in relation to the objects. A set of analytic function dependencies is determined. An information about a change in the object graph is received. A first analytic function instance in the set of analytic function instances that has to be re-executed based on the change is identified. A re-computation graph is recomputed using the analytic function instance. The re-computation graph is presented.

The change may be an addition, a deletion, a modification, or a combination thereof. The change may be a change in an object in the several of objects. The change may also be a change in a relationship between two objects. The change may also be a change in a relationship between an object in and an analytic function instance in the set of analytic function instances.

The change may also be a change in an analytic function instance in the set of analytic function instances. The change in the analytic function instance may be a change in an input bindings, a change in an analysis procedure, a change in a temporal semantics used in the analytic function instance, or a combination thereof.

Identifying the analytic function instance that has to be re-executed may include determining whether the analytic function instance receives an input time series from one of an object that has changed, an object whose relationship has changed, an object with which the relationship of the analytic function instance has changed, or a combination thereof. Identifying the analytic function instance may also include determining whether the analytic function instance receives the input time series that is changed as a result of an object that has changed, an object whose relationship has changed, a second analytic function instance whose relationship has changed, or a combination thereof. Identifying the analytic function instance may also include determining whether the analytic function instance, another analytic function instance directly related to the analytic function instance, another analytic function instance indirectly related to the analytic function instance, or a combination thereof has changed.

The re-computation graph may include a number of analytic function instances from the set of analytic function instances that is less than all analytic function instances in the set of analytic function instances. Furthermore, each analytic function instance in the number of analytic function instances may be re-executed as a result of the change. Additionally, computing the re-computation graph may use an iterative graph tracing of the object graph.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
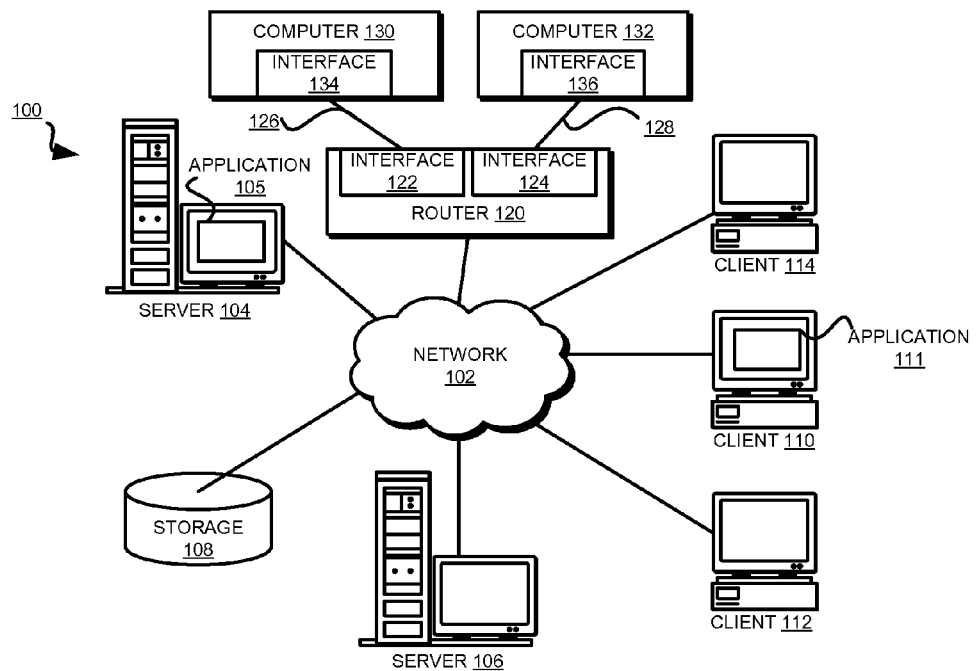
FIG. 1 depicts a pictorial representation of a network of data processing systems in which illustrative embodiments may be implemented.

The illustrative embodiments described herein provide a system, and computer usable program product for selective computation using analytic functions. The illustrative embodiments describe ways for selectively performing analysis re-computations in environments, for example, where changes in objects, time series, or analytic functions may warrant a re-computation of an analysis previously performed.

An element of a data processing environment, or a component of an element, is also known as a resource. When operating in a data processing environment, a resource may have one or more instances. An instance is a copy, an instance of a resource is a copy of the resource, and each instance of a resource is called an object. A resource type may have one or more instances, each representing an actual object, entity, thing, or a concept in the real world. A resource type is a resource of a certain type, classification, grouping, or characterization.

Additionally, a resource is a physical component of an environment, to with, a physical manifestation of a thing in a given environment. In some embodiments, a resource is itself a physical thing. For example, a hard disk, a computer memory, a network cable, a router, a client computer, a network interface card, and a wireless communication device are each an example of a resource that is a physical thing. In some embodiments, a resource may be logical construct embodied in a physical thing. For example, a software application located on a hard disk, a computer instruction stored in a computer memory, data stored in a data storage device are each an example of a resource that is a logical construct embodied in a physical thing.

An object is generally a logical construct or a logical representation of a corresponding resource. In many embodiments, an object is a logical structure, a data construct, one or more computer instructions, a software application, a software component, or other similar manifestation of a resource. The logical manifestation of an object is used as an example when describing an object in this disclosure.

However, in some embodiments, an object may itself be a physical manifestation of a physical resource. For example, a compact disc containing a copy of a software application may be a physical object corresponding to a resource that may be a compact disc containing the software application. The illustrative embodiments described in this disclosure may be similarly applicable to physical objects in some cases.

An object may relate to other objects. For example, an actual router present in an actual data processing environment may be represented as an object. The router may have a set of interfaces, each interface being a distinct object. A set of interfaces is one or more interfaces. In this example setup, the router object is related to each interface object. In other words, the router object is said to have a relationship with an interface object.

An object graph is a conceptual representation of the objects and their relationships in any given environment at a given point in time. A point or node in the object graph represents an object, and an arc connecting two nodes represents a relationship between the objects represented by those nodes.

An object may be a data source. A data source is a source of some data. For example, an interface object related to a router object may be data source in that the interface object may provide data about a number of data packets passing through the interface during a specified period.

Objects, object relationships, and object graphs may be used in any context or environment. For example, a particular baseball player may be represented as an object, with a relationship with a different baseball player object in a baseball team object. Note that the baseball player object refers to an actual physical baseball player. Similarly, the baseball team object refers to an actual physical baseball team.

The first baseball player object may be source of data that may be that player's statistics. In other words, that player's statistics, for example, homeruns, is data that the player object—the data source—emits with some periodicity, such as after every game. The baseball team object may also be a data source, emitting team statistics data, which may be dependent on one or more player objects' data by virtue of the team object's relationship with the various player objects. Note that a characteristic of an object, such as emitting data or relating to other objects, refers to a corresponding characteristic of a physical resource in an actual environment that corresponds to the object.

Data emitted by a data source is also called a time series. In statistics, signal processing, and many other fields, a time series is a sequence of data points, measured typically at successive times, spaced according to uniform time intervals, other periodicity, or other triggers. An input time series is a time series that serves as input data. An output time series is a time series that is data produced from some processing. A time series may be an output time series of one object and an input time series of another object.

Time series analysis is a method of analyzing time series, for example to understand the underlying context of the data points, such as where they came from or what generated them. As another example, time series analysis may analyze a time series to make forecasts or predictions. Time series forecasting is the use of a model to forecast future events based on known past events, to with, to forecast future data points before they are measured. An example in econometrics is the opening price of a share of stock based on the stock's past performance, which uses time series forecasting analytics.

Analytics is the science of data analysis. An analytic function is a computation performed in the course of an analysis. An analytic model is a computational model based on a set of analytic functions. As an example, a common application of analytics is the study of business data using statistical analysis, probability theory, operation research, or a combination thereof, in order to discover and understand historical patterns, and to predict and improve business performance in the future.

An analytic function specification is a code, pseudo-code, scheme, program, or procedure that describes an analytic function. An analytic function specification is also known as simply an analytic specification.

An analytic function instance is an instance of an analytic function, described by an analytic function specification, and executing in an environment. For example, two copies of a software application that implements an analytic function may be executing in different data processing systems in a data processing environment. Each copy of the software application would be an example of an analytic function instance.

As objects have relationships with other objects, analytic function instances can depend on one another. For example, one instance of a particular analytic function may use as an input time series, an output time series of an instance of another analytic function. The first analytic function instance is said to be depending on the second analytic function instance. Taking the baseball team example described above, an analytic function instance that analyzes a player object's statistics may produce the player object's statistics as an output time series. That output time series may serve as an input time series for a different analytic function instance that analyzes the team's statistics.

Furthermore, as an object graph represents the objects and their relationships, a dependency graph represents the relationships and dependencies among analytic function instances. The nodes in a dependency graph represent analytic function instances, and arcs connecting the nodes represent the dependencies between the nodes. Thus, by using a system of logical representations and computations, analytic functions and their instances analyze information and events that pertain to physical things in a given environment.

For example, with a stock market as an environment, analytic functions and their instances may analyze data pertaining to events relating to a real stock, which may be manifested as an identifier or a number in a physical system, or as a physical stock certificate. Analytic functions may thus compute predictions about that stock. As another example, with a baseball league as an environment, analytic functions and their instances may analyze data pertaining to real players and real teams, which manifest as physical persons and organizations. Analytic functions may thus compute statistics about the real persons and organizations in the baseball league.

An analytic function may be instantiated in relation to a resource. Such a resource is called a "deployment resource". An object corresponding to the deployment resource that has an analogous relationship with an analytic function instance of the analytic function is called a deployment object.

An analytic function may sample an input time series in several ways. Sampling a time series is reading, accepting, using, considering, or allowing ingress to a time series in the computation of the analytic function. An analytic function may sample an input time series periodically, such as by reading the input time series data points at a uniform interval. An analytic function may also sample an input time series by other trigger. For example, an analytic function may sample an input time series at every third occurrence of some event.

Furthermore, an analytic function may sample a time series based on a "window". A window is a set of time series data points in sequence. For example, an analytic function may sample a time series in a window that covers all data points in the time series for the past one day. As another example, an analytic function may sample a time series in a window that covers all data points in the time series generated for the past thirty events.

Additionally, an analytic function may use a sliding window or a tumbling window for sampling a time series. A sliding window is a window where the span of the window remains the same but as the window is moved to include a new data point in the time series, the oldest data point in the time series in the previous coverage of the window falls off. A tumbling window is a window where the span of the window remains the same but as the window is moved to include a new set of data points in the time series, all the data points in the time series in the previous coverage of the window fall off.

For example, consider that a time series data points are 1, 2, 3, 4, 5, 6, 7, 8, 9, and 10. Also consider that an analytic function uses a window spanning three data points in this time series. At a given instance, the window may be so positioned that the analytic function samples the data points 4, 5, and 6. If the analytic function uses a sliding window, and slides the window one position, the analytic function will sample the data points 5, 6, and 7 in the time series. If the analytic function uses a tumbling window, the analytic function will sample data points 7, 8, and 9 in the time series.

Temporal semantics is a description in an analytic function specification describing how the analytic function samples a time series. Temporal semantics of an analytic function may include window description, including a span of the window and a method of moving the window, that the analytic function uses for sampling the time series.

An analytic function specification may specify a set of temporal semantics for the analytic function. A set of temporal semantics is one or more temporal semantics. For example, the analytic function may use different temporal semantic for different input time series. As another example, an analytic function may provide a user the option to select from a set of temporal semantics a temporal semantics of choice for sampling a time series.

Many implementations store the data points of time series and provide those stored time series to analytic function instances for analyzing after some time. Such a method of providing time series to analytic function instances is called a store and forward processing. Some implementations provide the data points of a time series to an analytic function instance as the data points are received where the analytic function instance may be executing. Such a method of providing time series to analytic function instances is called stream processing.

As described above, an object represents a resource that may be a physical thing in a given environment, and a characteristic of an object refers to a corresponding characteristic of a physical resource that corresponds to the object in an actual environment. Thus, by using a system of logical representations and computations, analytic functions analyze information and events that pertain to physical things in a given environment.

Illustrative embodiments recognize that in an environment, a data source may experience changes, a time series emitted by a data source may change, sometimes retroactively. Illustrative embodiments also recognize that analytic functions themselves may change, also retro-actively in some cases.

For example, in a data processing environment, an object may have collected data from a router's various interfaces at 1 second interval but may have emitted a data point in a time series at 5 second intervals. Following a network interruption in the vicinity of the router, an administrator may want to analyze more closely the data at 1 second intervals.

As another example, a new version of an analytic function specification may become available that may use a modified algorithm to analyze the same time series and produce a better analysis. In some cases, it may be desirable to re-compute past analysis using stored time series from the past in conjunction with the new analytic function. Illustrative embodiments recognize that these and many other changes in an object graph of an environment may warrant re-computation of some analysis.

Illustrative embodiments further recognize that presently, when an object graph changes, all analyses are recomputed. Re-computing an analysis using an analytic function is resource intensive and consumes significant amount of resources in a given environment. Illustrative embodiments recognize that analytic functions may use multiple data sources organized in relationship hierarchies that can be complex. Analytic functions may themselves be in a hierarchy or be a part of exiting hierarchies, adding to the complexity. Thus, illustrative embodiments recognize that re-computing all analyses, sometimes using thousands and even millions of analytic function instances can be prohibitively expensive and wasteful use of resources.

To address these and other problems related to using analytic functions, the illustrative embodiments provide a system, and computer usable program product for selective re-computation using analytic functions. The illustrative embodiments are described using a data processing environment only as an example for the clarity of the description. The illustrative embodiments may be used in conjunction with any application or any environment that may use analytics, including but not limited to data processing environments.

For example, the illustrative embodiments may be implemented in conjunction with a manufacturing facility, sporting environment, financial and business processes, data processing environments, scientific and statistical computations, or any other environment where analytic functions may be used. The illustrative embodiments may also be implemented with any data network, business application, enterprise software, and middleware applications or platforms. The illustrative embodiments may be used in conjunction with a hardware component, such as in a firmware, as embedded software in a hardware device, or in any other suitable hardware or software form.

Any advantages listed herein are only examples and are not intended to be limiting on the illustrative embodiments. Additional advantages may be realized by specific illustrative embodiments. Furthermore, a particular illustrative embodiment may have some, all, or none of the advantages listed above.

Figure 2:
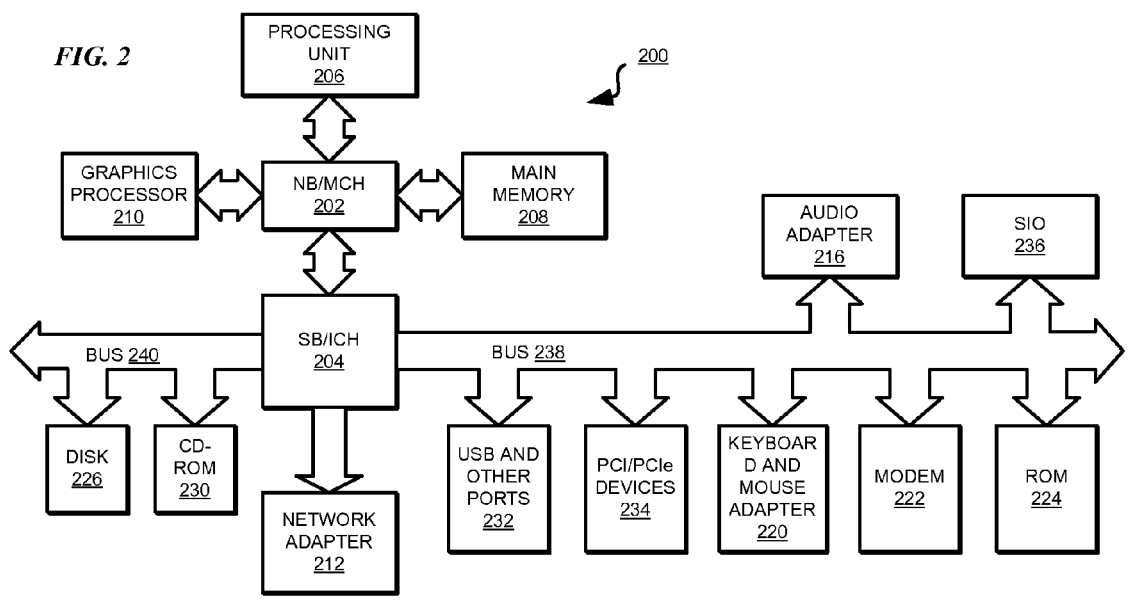
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108 that may include a storage medium.

Software applications may execute on any computer in data processing environment 100. In the depicted example, server 104 includes application 105, which may be an example of a software application, in conjunction with which the illustrative embodiments may be implemented. In addition, clients 112, and 114 couple to network 102. Client 110 may include application 111, which may engage in a data communication with application 105 over network 102, in context of which the illustrative embodiments may be deployed.

Router 120 may connect with network 102. Router 120 may use interfaces 122 and 124 to connect to other data processing systems. For example, interface 122 may use link 126, which is a communication pathway, to connect with interface 134 in computer 130. Similarly, interface 124 connects with interface 136 of computer 132 over link 128.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 provides data, such as boot files, operating system images, and applications to clients 110, 112, and 114. Clients 110, 112, and 114 are clients to server 104 in this example. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® XP (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
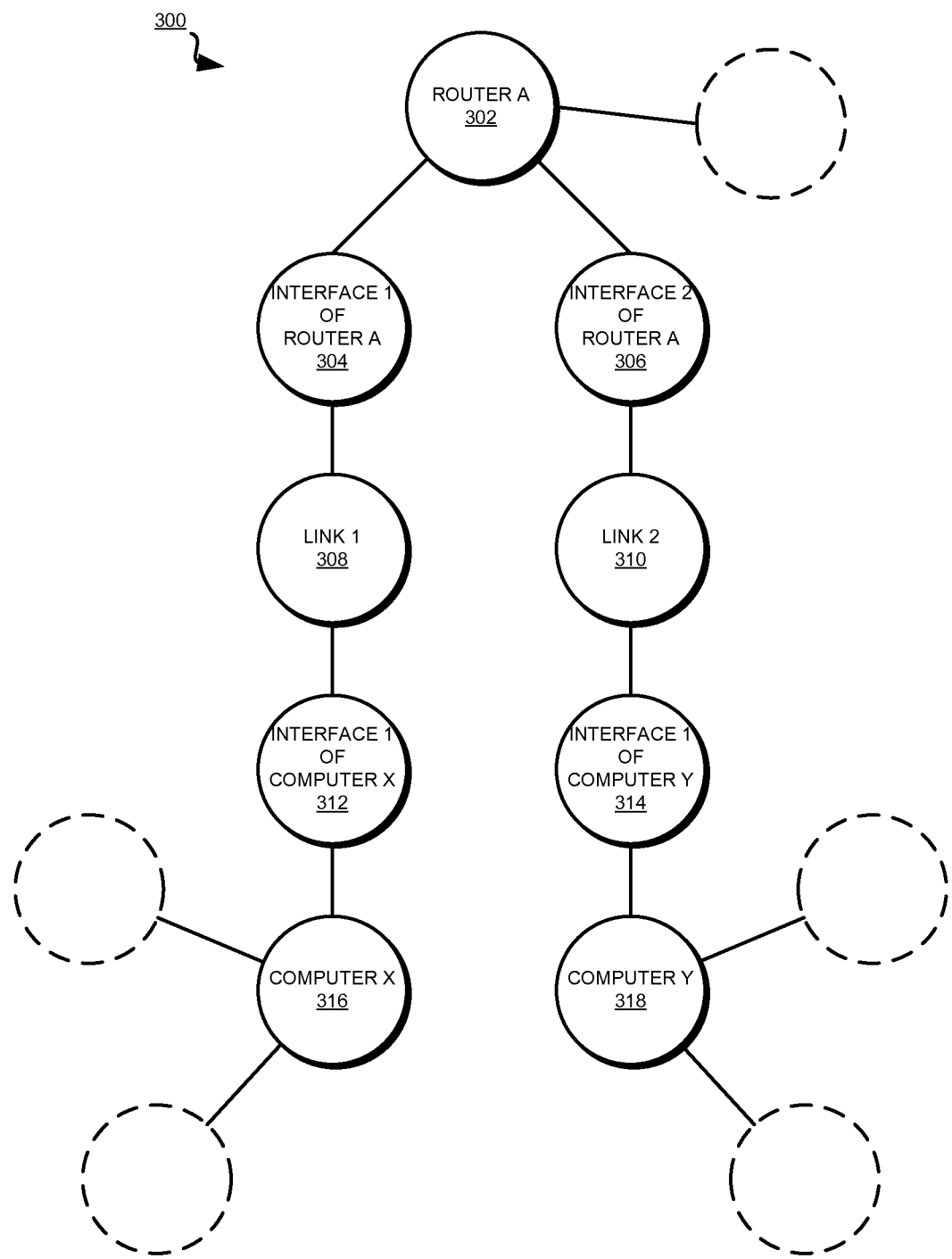
FIG. 3 depicts an object graph in which the illustrative embodiments may be implemented.

With reference to FIG. 3, this figure depicts an object graph in which the illustrative embodiments may be implemented. Object graph 300 may be implemented using a part of data processing environment 100 in FIG. 1. For example, in FIG. 1, servers 104 and 106, clients 110, 112, and 114, storage 108, and network 102 may be resources in data processing environments 100 that may be represented as objects in object graph 300. Each of these resources may include numerous components. Those components may in turn be objects related to the objects representing the resources. Router 120 may be another resource in data processing environment 100 that includes interfaces 122 and 124. Router 120 may be a resource that has relationships with interface 122 resource and interface 124 resource. Router 120 uses data links 126 and 128 to provide data communication services to computers 130 and 132.

In other words, an object representing interface 122 resource is related via an object representing link 126 resource to an object representing interface 134 resource, which is related to an object representing computer 130 resource. Similarly, an object representing interface 124 resource is related via an object representing link 128 resource to an object representing interface 136 resource, which is related to an object representing computer 132 resource. Recall that an object represents a resource that may be a physical thing in a given environment. Further recall that a characteristic of an object, such as emitting data or relating to other objects, refers to a corresponding characteristic of a physical resource in an actual environment that corresponds to the object.

In FIG. 3, object 302 labeled "router A" may be an object representation on object graph 300 of router 120 in FIG. 1. Objects 304 labeled "interface 1 of router A" and object 306 labeled "interface 2 of router A" may be objects representing interfaces 122 and 124 respectively in FIG. 1. Object 302 is related to objects 304 and 306 as depicted by the arcs connecting these objects. Object 302 may similarly be related to any number of other objects, for example, other interface objects similar to objects 304 and 306.

Object 308 labeled "link 1" may represent link 126 in FIG. 1. Object 310 labeled "link 2" may represent link 128 in FIG. 1. Object 312 labeled "interface 1 of computer X" may represent interface 134 in FIG. 1. Object 314 labeled "interface 1 of computer Y" may represent interface 136 in FIG. 1. Object 316 labeled "computer X" may represent computer 130 in FIG. 1. Object 318 labeled "computer Y" may represent computer 132 in FIG. 1. Objects 316 and 318 may similarly be related to any number of other objects, for example, other interface objects similar to objects 312 and 314 respectively.

Thus, object graph 300 represents an example actual data processing environment, example actual elements in that data processing environment, and example relationships among those elements. An object represented in object graph 300 may have any number of relationships with other objects within the scope of the illustrative embodiments.

Furthermore, any object in object graph 300 may act as a data source, emitting one or more time series. An object represents a resource in a given environment. An object emits a time series in an object graph if the resource emits the data points of the time series in the environment. Just as an object may emit one or more time series, an object may not emit any time series at all because a resource corresponding to the object may not emit any data. For example, one type of power supply may not emit any data but simply provide power in a data processing environment. Another type of power supply may include an administration application and emit monitoring data about the status of the power supply. Thus, an object corresponding to the first type of power supply resource may not emit a time series, whereas an object corresponding to the second type of power supply may emit a time series.

Figure 4:
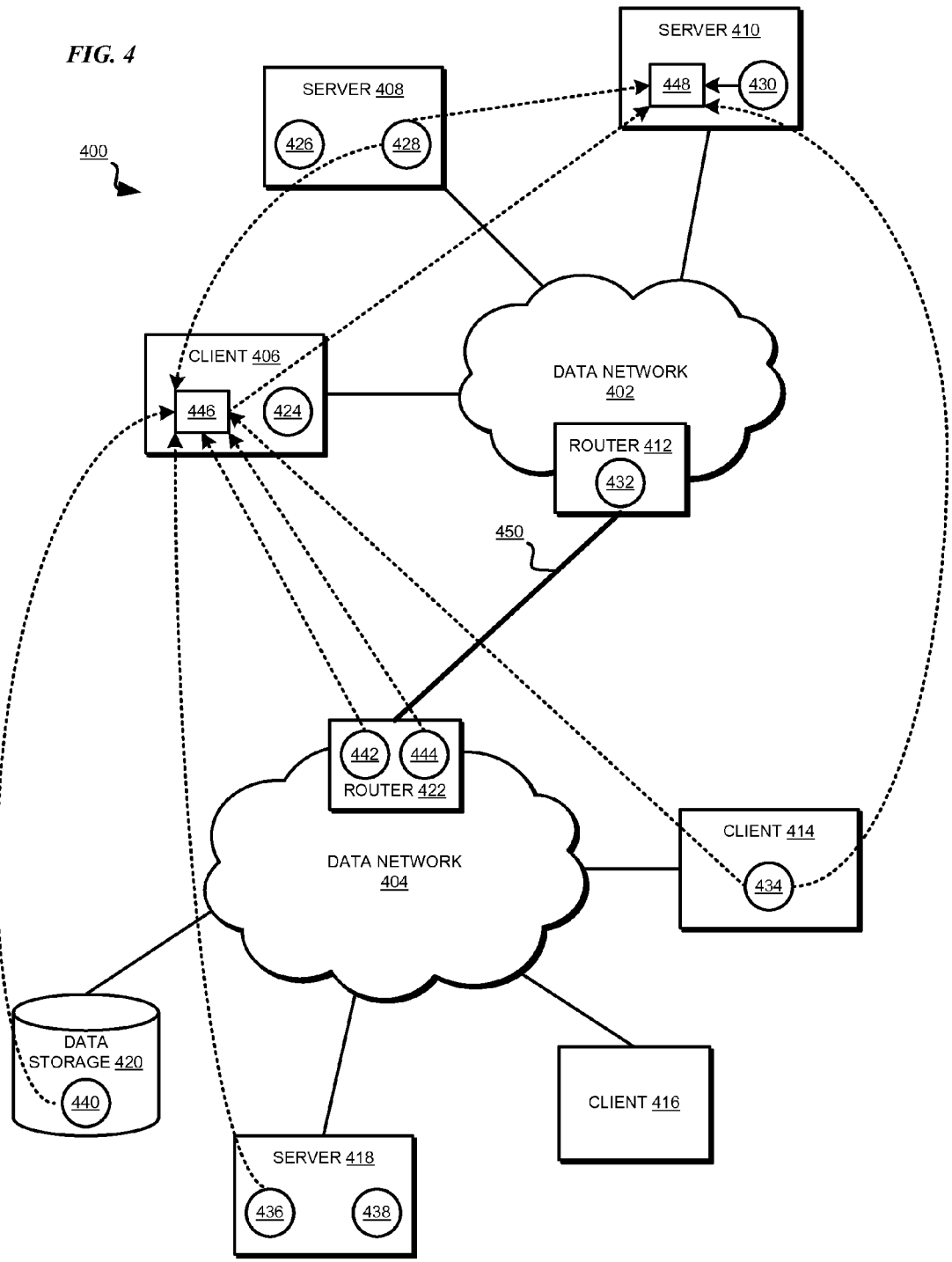
FIG. 4 depicts a block diagram of analytic function instances and data sources scattered in a distributed data processing environment in which the illustrative embodiments may be implemented.

With reference to FIG. 4, this figure depicts a block diagram of analytic function instances and data sources scattered in a distributed data processing environment in which the illustrative embodiments may be implemented. Data processing environment 400 is an example data processing environment selected for the clarity of the description of the illustrative embodiments. Data processing environment 400 may be implemented using data processing environment 100 in FIG. 1. Data networks 402 and 404 may each be analogous to network 102 in FIG. 1.

Client 406, server 408, and server 410 may be data processing systems connected to data network 402. Router 412 may be a data routing device, such as a router, a hub, or a switch that may facilitate data communication to and from data network 402 to other networks, such as the internet or data network 404.

Client 414, client 416, server 418, and data storage device 420 may be data processing systems or components thereof connected to data network 404. Router 422 may be a data routing device, such as a router, a hub, or a switch that may facilitate data communication to and from data network 404 to other networks, such as the internet or data network 402.

A data processing system or a component of a data processing system may be an object or may have an object executing thereon, the object being a data source. For example, object 424 may be a software application component executing on client 406, emitting one or more time series. Objects 426 and 428 may be present at server 408 such that object 426 or object 428 may be server 408, an application component, or an application executing thereon and emitting time series. Similarly, object 430 may be present at server 410. Likewise, object 432 may be present at router 412. For example, object 432 may be a collector application executing on or communication with router 412, collecting raw data from router 412, and generating various time series.

Similarly, object 434 may be present at client 414, objects 436 and 438 may be present at server 418, and object 440 may be present at data storage device 420. Objects 442 and 444 may be present at router 422. Some or all of objects 434, 436, 438, 440, 442, 444 may generate one or more time series. Again, objects 442, object 444, or both, may be collector applications or other types of data sources.

Analytic function instance 446 may be an instance of an analytic function executing on client 406 as an example. Analytic function instance 448 may be another instance of an analytic function that may be same or different from the analytic function of analytic function instance 446. Analytic function instance 446 may receive one or more time series from one or more data sources scattered anywhere in data processing environment 400. As an example, analytic function instance 446 is shown to receive input time series from objects 428, 434, 436, 440, 442, and 444. Analytic function instance 448, also as an example, is shown to receive input time series from objects 428 and 434. Analytic function instance 448 also receives as an input time series an output time series of analytic function instance 446.

The example depiction in FIG. 4 shows that an analytic function instance may receive time series from objects that may be on other data processing systems than where the analytic function instance may be executing. FIG. 4 also shows that receiving input time series at an analytic function instance and sending output time series to other analytic function instances in this manner may increase data traffic across networks, such as over link 450.

Furthermore, by reasons of distance of a data source from an analytic function instance, intervening systems between the analytic function instance and a data source, or due to difference in periodicity of the various data sources, time series may arrive at an analytic function instance at different times or rates. A result of this situation, for example, may be that the computation at the analytic function instance may slow down while waiting for a slow or distant data source. Another example result of this situation may be that a network throughput may be adversely affected.

Figure 5:
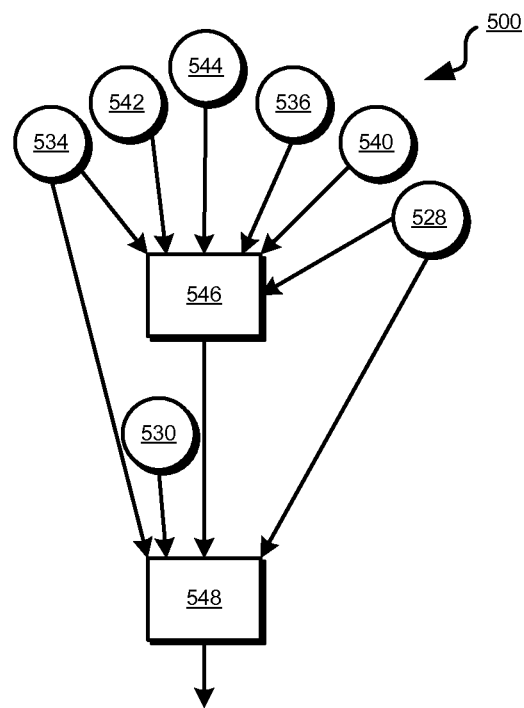
FIG. 5 depicts an object graph including analytic function instances in accordance with an illustrative embodiment.

With reference to FIG. 5, this figure depicts an object graph including analytic function instances in accordance with an illustrative embodiment. Object graph 500 may represent one example of environment 400 in FIG. 4. For example, Objects 528, 530, 534, 536, 540, 542, and 544 may correspond to objects 428, 430, 434, 436, 440, 442, and 444 respectively in FIG. 4 in such an example environment. Similarly, analytic function instances 546 and 548 may correspond to analytic function instances 446 and 448 respectively in FIG. 4.

Objects 528, 534, 536, 540, 542, and 544 provide input time series to analytic function instance 546. Analytic function instance 548 receives input time series from objects 528, 530, 534, and analytic function instance 546.

Objects, such as for example, objects 528 and 534, may generate more than one time series. In one embodiment, objects 528 and 534 may provide different time series to analytic function instances 546 and 548. In one embodiment, objects 528 and 534 may provide the same time series to analytic function instances 546 and 548.

Thus, object 546, an example analytic function instance, may analyze data from resources having a physical manifestation in a real environment. As depicted in the example environment of FIG. 4, analytic function of object 546 analyzes data that may originate from two network interfaces in a router, a software application executing in a client, two separate application components executing in two separate servers, and a data storage device. Notice that each of these sources of data is either a physical thing or a thing that has is identifiable to a physical thing in the environment of FIG. 4.

The input time series and the relationship between the various objects and analytic function instances in FIG. 4 is depicted only as an example and is not intended to be limiting on the illustrative embodiments. An analytic function instance may receive output time series from a combination of one or more analytic function instances and one or more objects. Furthermore, an analytic function instance, such as analytic function instance 546 or 548 may be instantiated in relation to an object that may or may not be depicted in object graph 500. For example, in one embodiment, analytic function instance 546 may be instantiated in relation with object 542 and receive a time series from object 542. In another embodiment, analytic function instance 546 may be instantiated in relation to an object not depicted in FIG. 5 but receive time series as depicted in FIG. 5. Other combinations of objects having relationships with analytic function instances are contemplated within the scope of the illustrative embodiments.

Figure 6:
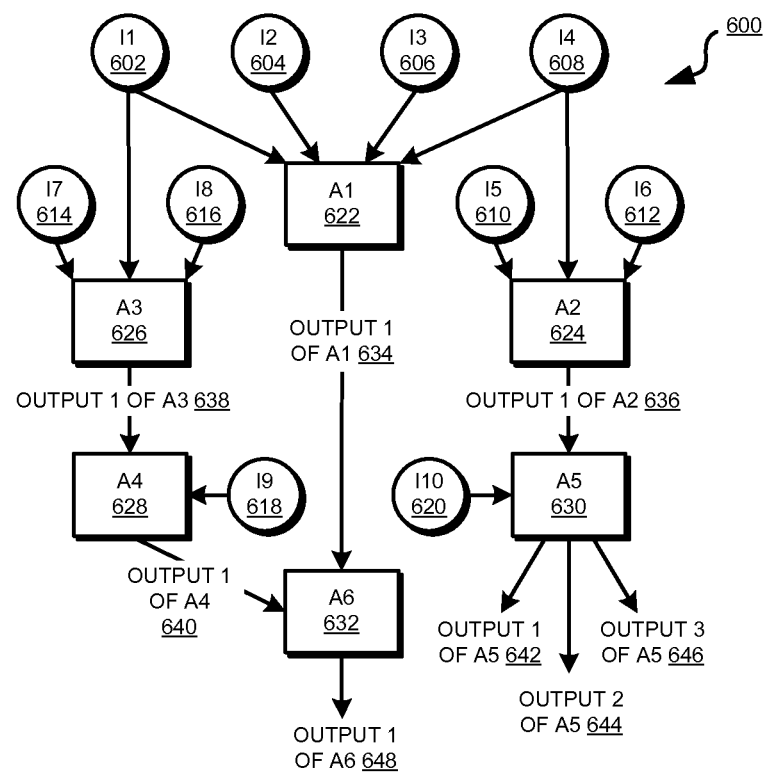
FIG. 6 depicts an example object graph in accordance with an illustrative embodiment.

With reference to FIG. 6, this figure depicts an example object graph in accordance with an illustrative embodiment. Object graph 600 as an example depicts another configuration of more complexity as compared to object graph 500 in FIG. 5. Object graph 600 depicts more interrelationships between the analytic function instances and time series as well as more dependencies between the analytic function instances as compared to object graph 500 in FIG. 5.

Object 602 emits time series "I1". Generally, an object may emit more than one time series in accordance with an illustrative embodiment. In one embodiment, as shown in FIG. 6, object 602 may emit two variations of time series I1 that may serve as different input time series to different analytic function instances.

Similarly, object 604 emits input time "I2". Object 606 emits time series "I3". Object 608 emits time series "I4". Object 610 emits time series "I5". Object 612 emits time series "I6". Object 614 emits time series "I7". Object 616 emits time series "I8". Object 618 emits time series "I9". Object 620 emits time series "I10".

Analytic function instance 622, labeled "A1" receives input time series I1, I2, I3, and I4 from objects 602, 604, 606, and 608 respectively. Analytic function instance 622 generates output time series 634 labeled "output 1 of A1". Analytic function instance 624, labeled "A2" receives input time series I4, I5, and I6 from objects 608, 610, and 612 respectively. Analytic function instance 624 generates output time series 636 labeled "output 1 of A2". Analytic function instance 626, labeled "A3" receives input time series I1, I7, and I8 from objects 602, 614, and 616 respectively. Analytic function instance 626 generates output time series 638 labeled "output 1 of A3".

Analytic function instance 628, labeled "A4" receives input time series I9 from object 618 and output time series 638 from analytic function instance 626. Analytic function instance 628 generates output time series 640 labeled "output 1 of A4". Analytic function instance 630, labeled "A5" receives input time series I10 from object 620 and output time series 636 from analytic function instance 624. Analytic function instance 630 generates output time series 642 labeled "output 1 of A5", output time series 644 labeled "output 2 of A5", and output time series 646 labeled "output 3 of A5". Analytic function instance 632, labeled "A6" receives output time series 634 from analytic function instance 622 and output time series 640 from analytic function instance 628. Analytic function instance 622 generates output time series 648 labeled "output 1 of A6".

Figure 7:
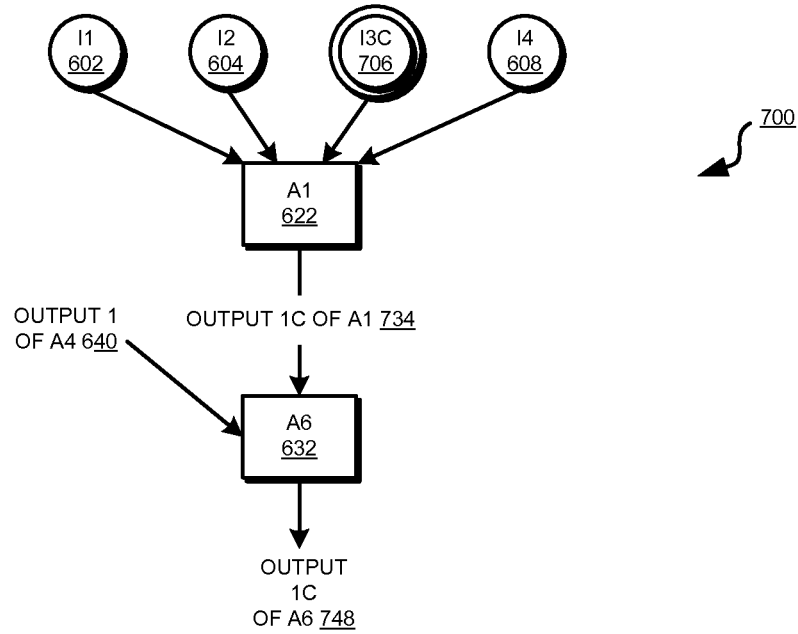
FIG. 7 depicts an object graph for a selective re-computation using analytic functions in accordance with an illustrative embodiment.

With reference to FIG. 7, this figure depicts an object graph for a selective re-computation using analytic functions in accordance with an illustrative embodiment. FIG. 7 depicts a partial object graph from object graph 600 in FIG. 6, object graph 700, to illustrate the selective re-computation. Objects 602, 604, and 608 are the same as objects 602, 604, and 608 in FIG. 6. Objects 602, 604, and 608 emit time series I1, I2, and I4 respectively. Analytic function instances 622 and 632 are the same as analytic function instances 622 and 632 in FIG. 6. Output time series 740 is the same as output time series 640 in FIG. 6.

In many environments, a characteristic of a resource can change from one point in time to another. For example, in an example data processing environment, a memory allocation to an application may reduce causing the application to reduce the speed of a time series it emits. In an object corresponding to the application in an object graph corresponding to the example data processing environment, the object will change accordingly.

In this figure, object 706 labeled "I3C" is a changed version of object 606 labeled "I3" in FIG. 6. In accordance with an illustrative embodiment, when an object providing an input time series to an analytic function instance changes, an analysis of the object graph is performed to determine which analytic function instances are affected by that change. Based on this analysis, the illustrative embodiment identifies the analytic function instances whose analyses have to be recomputed to accommodate the changed object in the object graph.

In this figure, the analysis according to the illustrative embodiment shows that only analytic function instance 622 and analytic function instance 632 have some dependency on object 706. Analytic function instance 622 receives an input time series from object 706, now changed from a previous state similar to object 606 in FIG. 6. Consequently, analysis of analytic function instance 622 has to be re-computed to accommodate the change.

Analytic function instance 632 receives as an input time series, output time series 734 from analytic function instance 622. Because the analysis of analytic function instance 622 may have to be re-computed, output time series 734 may change as a consequence of change in object 706 from a previous output time series that analytic function instance 622 produced, such as output time series 634 in FIG. 6. Output time series 734 is labeled "output 1C of A1" to reflect such a change.

The analysis of analytic function instance 632 may also have to be re-computed to accommodate the upstream change in object 706 even if "output 1 of A4" 640 remains the same as in FIG. 6. Re-computing the analysis of analytic function instance 632 may result in output time series 748, which may change from a previous output time series that analytic function instance 732 produced, such as output time series 648 in FIG. 6. Output time series 748 is labeled "output 1C of A6" to reflect such a change.

Notice that all analytic function instances do not have to be re-executed as is presently done to accommodate the change in object 706. Illustrative embodiments analyze object graph 600 in FIG. 6, to determine a part of the object graph that is affected by the change—object graph 700. The object graph or a part thereof identified in this manner is called a re-computation graph.

Illustrative embodiments then analyze the dependencies in object graph 700 and identify which analytic function instances are to be re-executed to re-compute their analyses.

In the example used in FIG. 7, analytic function instances corresponding to analytic function instances 624, 626, 628, and 630 in FIG. 6 are absent because they do not accept input I3 or I3C and their analyses are not affected by changed object 706.

Figure 8:
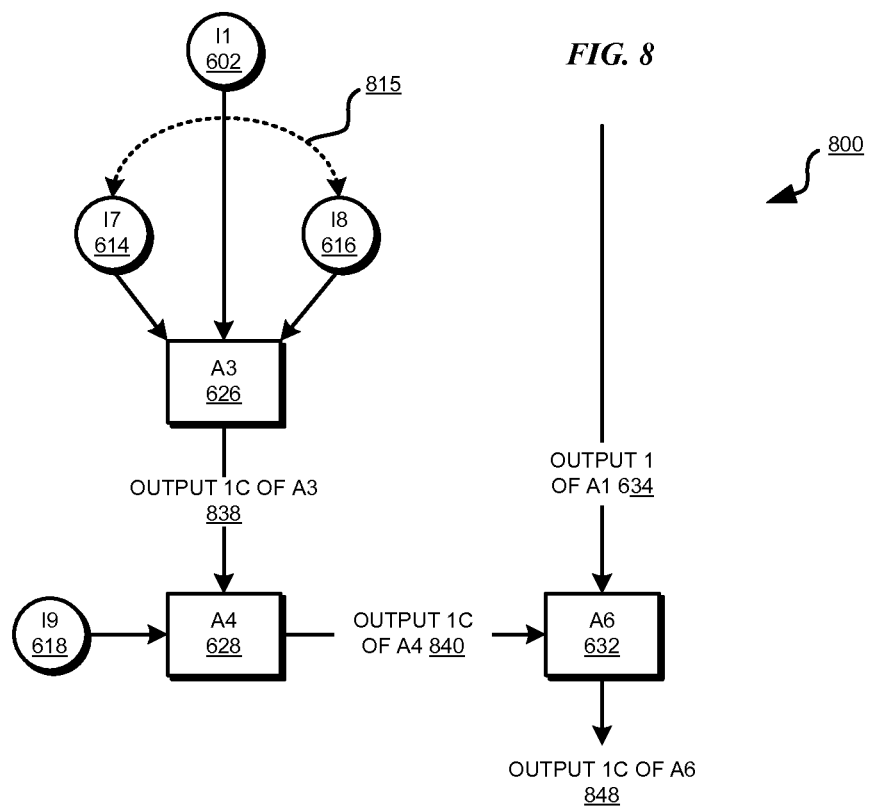
FIG. 8 depicts an object graph for another selective re-computation using analytic functions in accordance with an illustrative embodiment.

With reference to FIG. 8, this figure depicts an object graph for an example of selective re-computation using analytic functions in accordance with an illustrative embodiment. FIG. 8 depicts a partial object graph from object graph 600 in FIG. 6, object graph 800, to illustrate an example of the selective re-computation. Objects 602, 614, 616, and 618 are the same as objects 602, 614, 616, and 618, respectively, in FIG. 6. Objects 802, 814, 816, and 818 emit time series I1, I7, I8, and I9 respectively. Analytic function instances 626, 628, and 632 are the same as analytic function instances 626, 628, and 632 in FIG. 6. Output time series 634 is the same as output time series 634 in FIG. 6.

In many environments, interrelationships between resources can change from one point in time to another. For example, in an example data processing environment, a first device may change its coupling from one interface of a second device to a different interface of the second device. In objects corresponding to the first and second devices in an object graph corresponding to the example data processing environment, the relationship between the two objects will change accordingly.

In this figure, relationship 815 reflects a change in a relationship between objects 614 and 616 from a previous relationship between objects 614 and 616 may have had (not shown) in FIG. 6. In accordance with an illustrative embodiment, when a relationship between objects providing input time series to an analytic function instance changes, an analysis of the object graph is performed to determine which analytic function instances are affected by that change. Based on this analysis, the illustrative embodiment identifies the analytic function instances whose analyses have to be recomputed to accommodate the changed relationship in the object graph. The illustrative embodiments are described with respect to a change in a relationship between objects that are data sources only as an example. In one embodiment, a change in a relationship between a deployment object and an analytic function instance may cause a similar analysis and re-computation to occur.

In this figure, an analysis according to the illustrative embodiment shows that only analytic function instance 626, analytic function instance ns 628, and analytic function instance 632 have some dependency on the relationship between objects 614 and 616. Analytic function instance 626 receives input time series from objects 614 and 616, whose relationship with each other has now changed from a corresponding relationship between objects 614 and 616 in FIG. 6. Changed relationship 815 may change the input time series from object 614, the input time series from object 616, or both. Consequently, analysis of analytic function instance 626 has to be re-computed to accommodate the change.

Analytic function instance 628 receives as an input time series, output time series 838 from analytic function instance 626. The other input time series to analytic function instance 628 from object 618 has not changed. However, because the analysis of analytic function instance 626 may have to be re-computed, output time series 838 may change. Output time series 838 is labeled "output 1C of A3" to reflect such a change.

Analytic function instance 628 may also have to be re-executed to accommodate the upstream change in changed relationship 815. Re-computing the analysis of analytic function instance 628 may result in output time series 840, which may change from a previous output time series that analytic function instance 628 produced, such as output time series 640 in FIG. 6. Output time series 840 is labeled "output 1C of A4" to reflect such a change.

Analytic function instance 632 receives as an input time series, output time series 840 from analytic function instance 628. The other input time series to analytic function instance 632 output time series 634 from analytic function instance A1, such as analytic function instance 622 in FIG. 6, has not changed. However, because analytic function instance 628 may have to be re-executed, output time series 840 may change as described above.

Analytic function instance 632 may also have to be re-executed to accommodate the upstream change in changed relationship 815. Re-computing the analysis of analytic function instance 632 may result in output time series 848, which may change from a previous output time series that analytic function instance 632 produced, such as output time series 648 in FIG. 6. Output time series 848 is labeled "output 1C of A6" to reflect such a change.

Notice that all analytic function instances do not have to be re-executed as is presently done to accommodate changed relationship 815. Illustrative embodiments analyze object graph 600 in FIG. 6, to determine a part of the object graph that is affected by the change—object graph 800. Object graph 800 is another example of a re-computation graph.

Illustrative embodiments then analyze the dependencies in object graph 800 and identify which analytic function instances are to be re-executed to re-compute their analyses. In the example used in FIG. 8, analytic function instances corresponding to analytic function instances 622, 624, and 630 in FIG. 6 are absent because they do not accept input time series I7 or I8 and their analyses are not affected by changed relationship 815.

Figure 9:
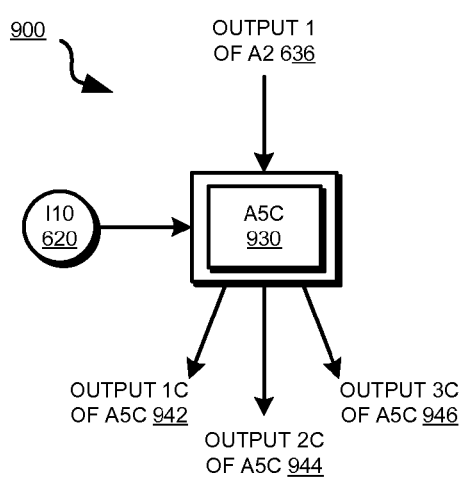
FIG. 9 depicts an object graph for another selective re-computation using analytic functions in accordance with an illustrative embodiment.

With reference to FIG. 9, this figure depicts an object graph for another example of selective re-computation using analytic functions in accordance with an illustrative embodiment. FIG. 9 depicts re-computation graph 900 that is a partial object graph from object graph 600 in FIG. 6 to illustrate the selective re-computation. Object 620 is the same as objects 620 in FIG. 6 and emits time series I10. Output time series 636 is the same as output time series 636 in FIG. 6.

In many environments, an analytic function may have to be changed from one point in time to another. For example, in an example data processing environment, a management report may have used a certain set of outputs from an analysis of a set of input data in the past. The management report may now need some additional data from the analysis of the same set of input data. Such a change in requirements often results in a change in the analysis procedure implemented in an analytic function specification of an analytic function. Instances based on that analytic function change accordingly.

Furthermore, in the example above, the management report may want the additional data analyzed from some past set of input data. Thus, a changed analytic function instance may have to be re-executed with respect to some historical input time series data points stored somewhere.

As another example, a statistician may change an algorithm of an analytic function. The changed algorithm may be implemented in an analytic function specification. The changed analytic function specification may result in changed analytic function instance based thereon. As another example, a system administrator may decide to change a temporal semantics to be used in an analytic function instance. Such a change may also result in a changed analytic function instance that may have to be re-executed.

In this figure, analytic function instance 930 is a changed version of analytic function instance 630 in FIG. 6. Changed analytic function instance 930 is labeled "A5C" to reflect its changed nature from object 630 labeled "A5" in FIG. 6.

In accordance with an illustrative embodiment, when an analytic function instance changes, an analysis of the object graph is performed to determine which analytic function instances are affected by that change. Based on this analysis, the illustrative embodiment identifies the analytic function instances whose analyses have to be recomputed to accommodate the changed analytic function instance. The illustrative embodiments are described with respect to a change in a single analytic function instance only as an example. In one embodiment, a change in multiple analytic function instances may cause a similar analysis and re-computation to occur.

In this figure, an analysis according to the illustrative embodiment shows that no other analytic function instances in object graph 600 in FIG. 6 have a dependency on changed analytic function instance 930. Analytic function instance 930 receives as an input time series, output time series 636 from an analytic function instance corresponding to analytic function instance 624 in FIG. 6. The other input time series to analytic function instance 930 from object 620 has not changed. None of the input time series to analytic function instance 930 have changed, however, analytic function instance 930 itself has changed. Consequently, only the analysis of analytic function instance 930 has to be re-computed to accommodate the change.

Re-computing the analysis of analytic function instance 930 may result in changed output time series 942, 944, and 946, which may change from previous output time series that analytic function instance 630 produced, such as output time series 642, 644, and 646 respectively in FIG. 6. Output time series 942 is labeled "output 1C of A5C", output time series 944 is labeled "output 2C of A5C", and output time series 946 is labeled "output 3C of A5C" to reflect such changes in the output time series originating from changed analytic function instance 930.

Notice again that all analytic function instances do not have to be re-executed as is presently done to accommodate changed analytic function instances 930. Illustrative embodiments analyze object graph 600 in FIG. 6, to determine a part of the object graph that is affected by the change—re-computation graph 900.

Illustrative embodiments then analyze the dependencies in re-computation graph 900 and identify which analytic function instances are to be re-executed to re-compute their analyses. In the example used in FIG. 9, analytic function instances corresponding to analytic function instances 622, 624, 626, and 628 in FIG. 6 are absent because they do not depend on changed analytic function instance 930. If an analytic function instance were dependent on changed analytic function instance 930, such as when an analytic function instance were to use one or more of changed output time series 942, 944, or 946, re-computation graph 900 would include that analytic function instance and perform re-computation of that analytic function instance's analysis as well.

Figure 10:
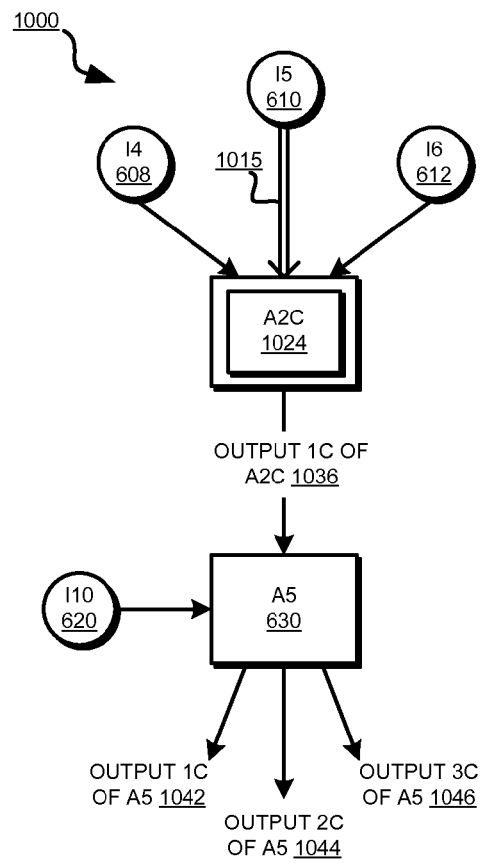
FIG. 10 depicts an object graph for another selective re-computation using analytic functions in accordance with an illustrative embodiment.

With reference to FIG. 10, this figure depicts an object graph for another example of selective re-computation using analytic functions in accordance with an illustrative embodiment. FIG. 10 depicts a partial object graph from object graph 600 in FIG. 6, object graph 1000, to illustrate the selective re-computation. Object graph 1000 is an example of a re-computation graph as described above. Objects 608, 610, 612, and 620 are the same as objects 608, 610, 612, and 620 in FIG. 6. Objects 608, 610, 612, and 620 emit time series I4, I5, I6, and I10 respectively. Analytic function instance 630 is the same as analytic function instance 630 in FIG. 6.

In many environments, interrelationships between resources and analytic functions can change from one point in time to another. For example, in an example data processing environment, a relationship between a communication link and an analytic function analyzing the link's performance may change. Between deployment object corresponding to the link and an analytic function instance corresponding to the analytic function, the relationship between the two objects will change accordingly. This change in relationship may be in combination with other changes as well. For example, a change in a relationship as described above may be accompanied by a change in the analytic function instance as described with respect to FIG. 9.

In this figure, analytic function instance 1024 is a changed version of analogous analytic function instance 624 in FIG. 6, in the manner described in FIG. 9. Relationship 1015 reflects a change in a relationship between object 610 and analytic function instance 1024. Object 610 in this example is both a deployment object for analytic function instance 1024 as well as a data source emitting time series I5 as an input to analytic function instance 1024.

In accordance with an illustrative embodiment, when a relationship between an object and an analytic function instance changes, an analysis of the object graph is performed to determine which analytic function instances are affected by that change. Based on this analysis, the illustrative embodiment identifies the analytic function instances whose analyses have to be recomputed to accommodate the changed relationship in the object graph.

In this figure, an analysis according to the illustrative embodiment shows that only analytic function instance 1024 and analytic function instance 630 have some dependency on the relationship between object 1010 and analytic function instance 1024. Analytic function instance 630 receives input time series from analytic function instance 1024's output time series. Changed relationship 1015 may cause many changes in object graph 1000. For example, changed relationship 1015 may change the data points in the input time series from object 610, nature or periodicity of that input time series, or some other characteristic of that input time series. As some more examples, changed relationship 1015 may also change a delay in receiving that time series at analytic function instance 1024, or a temporal semantics of analytic function instance 1024 may have to be changed to accommodate changed relationship 1015. Consequently, analysis of analytic function instance 1024 has to be re-computed to accommodate the change.

Analytic function instance 630 receives as an input time series, output time series 1036 from analytic function instance 1024. The other input time series to analytic function instance 630 from object 620 has not changed. However, because the analysis of analytic function instance 1024 may have to be re-computed, output time series 1036 may change. Output time series 1036 is labeled "output 1C of A2C" to reflect such a change.

Analytic function instance 630 may also have to be re-executed to accommodate the upstream change in changed relationship 1015, changed analytic function instance 1024, or both. Re-computing the analysis of analytic function instance 630 may result in output time series 1042, 1044, and 1046, which may change from a previous output time series that analogous analytic function instance 630 produced, such as output time series 642, 644, and 646 respectively in FIG. 6. Output time series 1042 is labeled "output 1C of A5", output time series 1044 is labeled "output 2C of A5", and output time series 1046 is labeled "output 3C of A5" to reflect such a change.

Notice again that all analytic function instances do not have to be re-executed as is presently done to accommodate changed relationship 1015. Illustrative embodiments analyze object graph 600 in FIG. 6, to determine a part of the object graph that is affected by the change—object graph 1000. Object graph 1000 is another example of a re-computation graph.

Illustrative embodiments then analyze the dependencies in re-computation graph 1000 and identify which analytic function instances are to be re-executed to re-compute their analyses. In the example used in FIG. 10, analytic function instances corresponding to analytic function instances 622, 626, 628, and 632 in FIG. 6 are absent because they are not affected by changed relationship 1015.

The examples used for describing the illustrative embodiments with respect to FIGS. 7, 8, 9, and 10 are selected for the clarity of the description and are not limiting on the illustrative embodiments. Many other circumstances and combinations thereof will be conceivable from this disclosure. Those circumstances and their combinations are contemplated within the scope of the illustrative embodiments.

Figure 11:
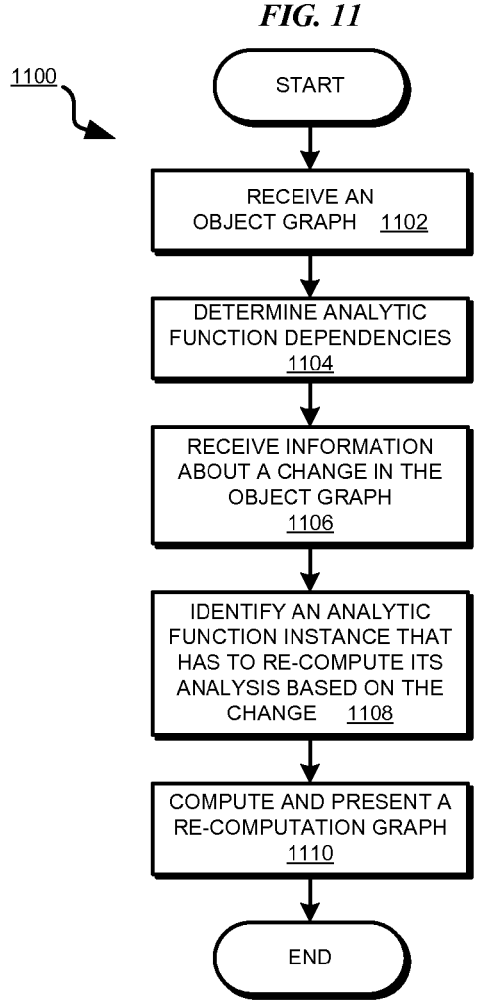
FIG. 11 depicts a flowchart of a process of selective re-computation using analytic functions in accordance with an illustrative embodiment.

With reference to FIG. 11, this figure depicts a flowchart of a process of selective re-computation using analytic functions in accordance with an illustrative embodiment. Process 1100 may be implemented in a software application, among other manifestations. For example, process 1100 may be implemented in application 105 in FIG. 1.

Process 1100 begins by receiving an object graph (step 1102). Process 1100 determines any analytic function dependencies (step 1104). An analytic function dependency is a relationship involving an analytic function instance. The analytic function dependency may include a dependency of an analytic function instance on one or more objects, dependency of an analytic function instance on a relationship between one or more objects, and a dependency of one analytic function instance on other one or more analytic function instances. A set of analytic function dependencies is one or more analytic function dependencies.

Process 1100 receives information about a change in the object graph received in step 1102 (step 1106). The change in the object graph may be any changes described with respect to FIGS. 7-10, other similar changes, or a combination thereof. Process 1100 identifies an analytic function instance that has to re-compute its analysis based on the change (step 1108). Process 1100 may identify the analytic function instance that has to be re-executed if the analytic function instance is directly or indirectly related to the change. A direct relation to a change is a relationship where the analytic function instance receives an input time series from an object or an analytic function instance that has changed. An indirect relation to a change is a relationship where the analytic function instance receives an input time series that changes as a result of the change, the change being at an object or an analytic function instance removed from the analytic function instance by any number of intervening objects or analytic function instances.

Process 1100 computes and presents a re-computation graph (step 1110). Process 1100 ends thereafter. In one embodiment of process 1100, the analytic function instances identified in the re-computation graph may be executed by same or different process.

In one embodiment, step 1110 may use an incremental graph tracing approach. In another embodiment, step 1110 may use a recursive graph tracing approach. Of course, an implementation may use any method of traversing an object graph for computing the re-computation graph in step 1110 without departing from the scope of the illustrative embodiments.

In one embodiment, process 1100 may further include steps for determining a reason for the change. For example, an event, agent, resource, process, or user that causes a change as described above may also annotate the change with a reason or code for that change. Process 1100 or another related process may identify the reason for the change using such annotation.

Furthermore, in another embodiment, additional steps in process 1100 or another related process may propagate the reason for the change through the selective re-computation using analytic functions. Propagating the reason for the change includes making the reason available to other processes, instances, and objects in the object graph.

Additional steps in process 1100 may preserve the affects of the change as well. For example, such a process may preserve a stored original time series that may have been previously analyzed, along with preserving a modified version of the time series as modified from the change.

Determining the reason for the change, propagating the reason for the change, modifying data based on the change, preserving the original form of data as well as data modified from the change, and any other related steps may be implemented as additional steps in process 1100, or in a separate but related process. Process 1100 may pass control to such a separate process, or receive control from such a process within the scope of the illustrative embodiments. Performing these additional steps or separate process may be useful in an environment, such as for example, in performing comparative studies of previous analysis with the changed analysis, or in performing an audit of the change.

The components in the block diagrams, the objects, instances, and relationships in object graphs, and the steps in the flowcharts described above are described only as examples. These artifacts have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, an apparatus, and computer program product are provided in the illustrative embodiments for selective re-computation using analytic functions. An object represents a resource that may be a physical thing in a given environment, and a characteristic of an object refers to a corresponding characteristic of a physical resource that corresponds to the object in an actual environment. Thus, by using a system of logical representations and computations, analytic functions analyze information and events that pertain to physical things in a given environment.

Using the illustrative embodiments, a user or a process may avoid having to re-compute all the analytic functions when a change occurs in an object graph. The illustrative embodiments may assist the user or process in identifying and selectively re-executing only those analytic function instances in the object graph that have some relationship with the change.

The illustrative embodiments may be used to selectively re-execute analytic function instances in such a way that may reduce resource consumption and improve performance in a given environment. The illustrative embodiments may be further used to manage analytic function instances re-execution in a controlled and selective manner based on a variety of changes possible in a given object graph representation of a changed environment. For example, the illustrative embodiments may be used for selective re-computation using analytic functions when an object corresponding to a resource changes. As some more examples, the illustrative embodiments may be used when a relationship in the object graph or an analytic function changes.

Selective re-computation according to the illustrative embodiments may change based on the particular changes in the resources in an environment. Similarly, processes according to the illustrative embodiments may allow a user or a process to selectively re-compute analytic functions differently in different object graphs.

Furthermore, the illustrative embodiments may be practiced in conjunction with environments where input time series are stored and forwarded to analytic functions. The illustrative embodiments may also be practiced in conjunction with environments where input time series are stream processed by the analytic functions.

The illustrative embodiments may be used in conjunction with any application or any environment that may use analytics. An example of such environments where the illustrative embodiments are applicable is a data processing environment, such as where a number of data processing systems, computing devices, communication devices, data networks, and components thereof may be in communication with each other. As another example, the illustrative embodiments may be implemented in conjunction with financial and business processes, such as where a number of persons, devices, or instruments may generate reports, catalogs, trends, factors, or values that have to be analyzed in a dynamic or changing environment.

As another example, the illustrative embodiments may be implemented in scientific and statistical computation environments, such as where a number of data processing systems, devices, or instruments may produce data that has to be analyzed in an unpredictable or dynamic environment. As another example, the illustrative embodiments may be implemented in a manufacturing facility where equipment, gadgets, systems, and personnel may produce products and information related to products in a flexible or dynamic environment.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from the bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer usable program product comprising a computer usable device including computer usable code for selective re-computation using analytic functions, the computer usable code comprising:

computer usable code for receiving an object graph, the object graph including a plurality of objects representing a plurality of resources in an environment, a resource in the plurality of resources comprising a physical component of the environment, an object in the plurality of objects comprising a logical construct corresponding to the physical component, the object graph further including a set of analytic function instances in relation to the plurality of objects, wherein an analytic function instance is an instance of an analytic function described by an analytic function specification, the instance executing in a data processing environment, and wherein the analytic function performs an analytical computation when the instance executes in the data processing environment;

computer usable code for determining a set of analytic function dependencies;

computer usable code for receiving an information about a change in the object graph;

computer usable code for identifying a first analytic function instance in the set of analytic function instances that has to be re-executed based on the change;

computer usable code for computing a re-computation graph using the analytic function instance, wherein the re-computation graph is a portion of the object graph such that the first analytic function instance located in the portion have to be re-executed responsive to the change; and computer usable code for presenting the re-computation graph.

2. The computer usable program product of claim 1, wherein the change is one of an addition, a deletion, and a modification, and wherein the change is one of (i) a first change in an object in the plurality of objects, (ii) a second change in a relationship between a first object and a second object in the plurality of objects, and (iii) a third change in a relationship between an object in the plurality of objects and an analytic function instance in the set of analytic function instances.

3. The computer usable program product of claim 1, wherein, the change is a change in an analytic function instance in the set of analytic function instances, wherein the change in the analytic function instance is one of (i) a change in an input bindings, (ii) a change in an analysis procedure, and (iii) a change in a temporal semantics used in the analytic function instance.

4. The computer usable program product of claim 1, wherein the computer usable code for identifying the first analytic function instance that has to be re-executed further comprises:

computer usable code for determining whether the first analytic function instance receives an input time series from one of (i) an object that has changed, (ii) an object whose relationship has changed, and (iii) an object with which the relationship of the analytic function instance has changed, wherein the input time series comprises data produced by the physical component corresponding to the object;

computer usable code for determining whether the first analytic function instance receives the input time series that is changed as a result of (i) an object that has changed, (ii) an object whose relationship has changed, and (iii) a second analytic function instance whose relationship has changed; and computer usable code for determining whether one of (i) the first analytic function instance, (ii) a third analytic function instance directly related to the first analytic function instance, and (iii) a fourth analytic function instance indirectly related to the first analytic function instance has changed.

5. The computer usable program product of claim 1, wherein the re-computation graph includes a plurality of analytic function instances from the set of analytic function instances, the plurality of analytic function instances including less than all analytic function instances in the set of analytic function instances, and wherein each analytic function instance in the plurality of analytic function instances is re-executed as a result of the change.

6. The computer usable program product of claim 1, wherein the computer usable code for computing the re-computation graph includes computer usable code for an iterative graph tracing of the object graph.

7. A data processing system for selective re-computation using analytic functions, the data processing system comprising:

a storage device including a storage medium, wherein the storage device stores computer usable program code; and a processor, wherein the processor executes the computer usable program code, and wherein the computer usable program code comprises:

computer usable code for receiving an object graph, the object graph including a plurality of objects representing a plurality of resources in an environment, a resource in the plurality of resources comprising a physical component of the environment, an object in the plurality of objects comprising a logical construct corresponding to the physical component, the object graph further including a set of analytic function instances in relation to the plurality of objects, wherein an analytic function instance is an instance of an analytic function described by an analytic function specification, the instance executing in a data processing environment, and wherein the analytic function performs an analytical computation when the instance executes in the data processing environment;

computer usable code for determining a set of analytic function dependencies;

computer usable code for receiving an information about a change in the object graph;

computer usable code for identifying a first analytic function instance in the set of analytic function instances that has to be re-executed based on the change;

computer usable code for computing a re-computation graph using the analytic function instance, wherein the re-computation graph is a portion of the object graph such that the first analytic function instance located in the portion have to be re-executed responsive to the change; and computer usable code for presenting the re-computation graph.

8. The data processing system of claim 7, wherein the change is one of an addition, a deletion, and a modification, and wherein the change is one of (i) a first change in an object in the plurality of objects, (ii) a second change in a relationship between a first object and a second object in the plurality of objects, and (iii) a third change in a relationship between an object in the plurality of objects and an analytic function instance in the set of analytic function instances.

9. The data processing system of claim 7, wherein, the change is a change in an analytic function instance in the set of analytic function instances, wherein the change in the analytic function instance is one of (i) a first change in an input bindings, (ii) a second change in an analysis procedure, and (iii) a third change in a temporal semantics used in the analytic function instance.

10. The data processing system of claim 7, wherein the computer usable code for identifying the first analytic function instance that has to be re-executed further comprises:

computer usable code for determining whether the first analytic function instance receives an input time series from one of (i) an object that has changed, (ii) an object whose relationship has changed, and (iii) an object with which the relationship of the analytic function instance has changed, wherein the input time series comprises data produced by the physical component corresponding to the object;

computer usable code for determining whether the first analytic function instance receives the input time series that is changed as a result of (i) an object that has changed, (ii) an object whose relationship has changed, and (iii) a second analytic function instance whose relationship has changed; and computer usable code for determining whether one of (i) the first analytic function instance, (ii) a third analytic function instance directly related to the first analytic function instance, and (iii) a fourth analytic function instance indirectly related to the first analytic function instance has changed.

11. The data processing system of claim 7, wherein the re-computation graph includes a plurality of analytic function instances from the set of analytic function instances, the plurality of analytic function instances including less than all analytic function instances in the set of analytic function instances, and wherein each analytic function instance in the plurality of analytic function instances is re-executed as a result of the change.

12. The data processing system of claim 7, wherein the computer usable code for computing the re-computation graph includes computer usable code for an iterative graph tracing of the object graph.

13. A computer implemented method for selective re-computation using analytic functions, the computer implemented method comprising:

receiving an object graph, the object graph including a plurality of objects representing a plurality of resources in an environment, a resource in the plurality of resources comprising a physical component of the environment, an object in the plurality of objects comprising a logical construct corresponding to the physical component, the object graph further including a set of analytic function instances in relation to the plurality of objects, wherein an analytic function instance is an instance of an analytic function described by an analytic function specification, the instance executing in a data processing environment, and wherein the analytic function performs an analytical computation when the instance executes in the data processing environment;

determining a set of analytic function dependencies;

receiving an information about a change in the object graph;

determining a reason for the change;

identifying a first analytic function instance in the set of analytic function instances that has to be re-executed based on the change;

computing a re-computation graph using the analytic function instance, wherein the re-computation graph is a portion of the object graph such that the first analytic function instances located in the portion have to be re-executed responsive to the change;

performing re-computations using the re-computation graph.

14. The computer implemented method of claim 13, wherein the reason for the change is an annotation included in the information about the change, the computer implemented method further comprising:

propagating the reason for the change in the re-computations.

15. The computer implemented method of claim 13, further comprising:

Preserving, in a storage medium, an input time series affected by the change in an unchanged form without the change and a form modified due to the change.

16. The computer implemented method of claim 13, wherein the change is one of an addition, a deletion, and a modification.

* * * * *